United States Patent [19]

Russ, Sr.

[11] 4,177,687
[45] Dec. 11, 1979

[54] V-BELT

[75] Inventor: Paul E. Russ, Sr., Littleton, Colo.

[73] Assignee: The Gates Rubber Company, Denver, Colo.

[21] Appl. No.: 934,122

[22] Filed: Aug. 16, 1978

[51] Int. Cl.² .............................................. F16G 5/20
[52] U.S. Cl. .................................. 74/231 C; 74/233; 74/234; 156/139
[58] Field of Search ................. 74/231 C, 231 P, 233, 74/234, 236; 156/137, 138, 139, 140, 141

[56] References Cited

U.S. PATENT DOCUMENTS

| 1,546,704 | 7/1925 | Barker | 74/236 |
| 1,982,869 | 12/1934 | Heyer | 156/141 |
| 2,189,049 | 2/1940 | Ungar | 74/233 |
| 2,322,466 | 6/1943 | Perry | 74/236 |
| 2,387,183 | 10/1945 | Reeves | 74/236 |
| 2,406,253 | 8/1946 | Reeves | 74/236 |
| 2,638,007 | 5/1953 | Reeves | 74/236 |
| 2,647,410 | 8/1953 | Reeves | 74/236 |

FOREIGN PATENT DOCUMENTS

| 418515 | 10/1934 | United Kingdom | 74/236 |
| 1286777 | 8/1972 | United Kingdom | 74/233 |

*Primary Examiner*—C. J. Husar
*Assistant Examiner*—Conrad Berman
*Attorney, Agent, or Firm*—H. W. Oberg, Jr.; Raymond Fink; Curtis H. Castleman, Jr.

[57] ABSTRACT

A V-belt of preferably the variable speed type with a plurality of V-blocks attached to a flat belt type load carrying section, the blocks having an embedded or partially embedded reinforcement which surrounds and supports the load carrying section. The generally flat type load carrying section is preferably of a symmetrical construction with an overcord and undercord sandwiching a tensile member. A plurality of transversely oriented ribs or teeth are located at the radially inner and outer surfaces of the load carrying section, a rib coinciding in position with the surrounding reinforcement member of each polymer block. A method for making the V-belt by fabricating a flat load carrying section with an overcord and undercord, attaching spaced reinforcements to the flat belt and surrounding the flat belt therewith, forming polymer material around at least portions of the reinforcement and defining V driving surfaces of the belt, molding the belt while simultaneously displacing portions of the flat belt from an area between spaced reinforcements to a location adjacent the reinforcements and forming transversely oriented ribs and molding and curing the belt.

18 Claims, 10 Drawing Figures

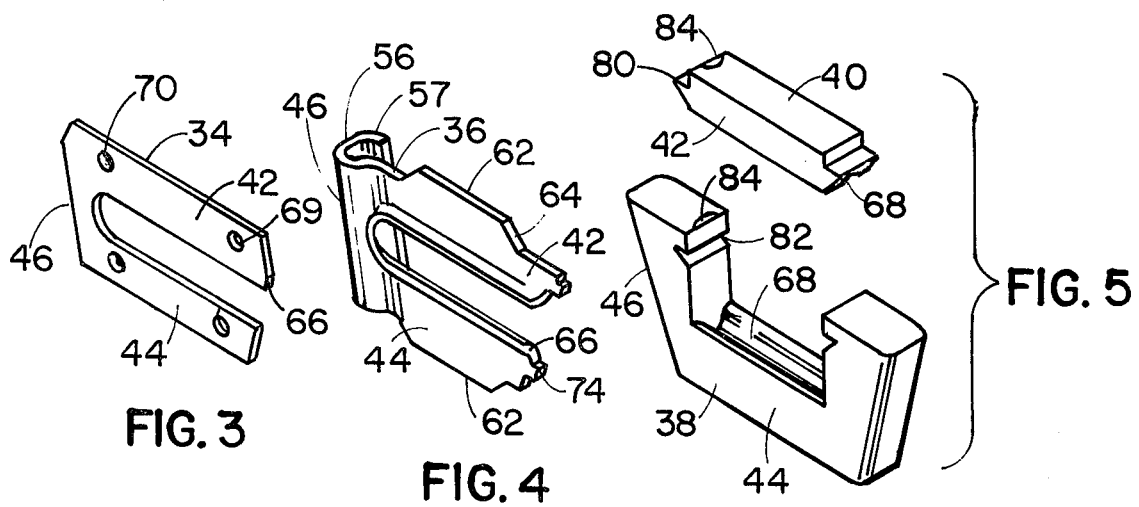
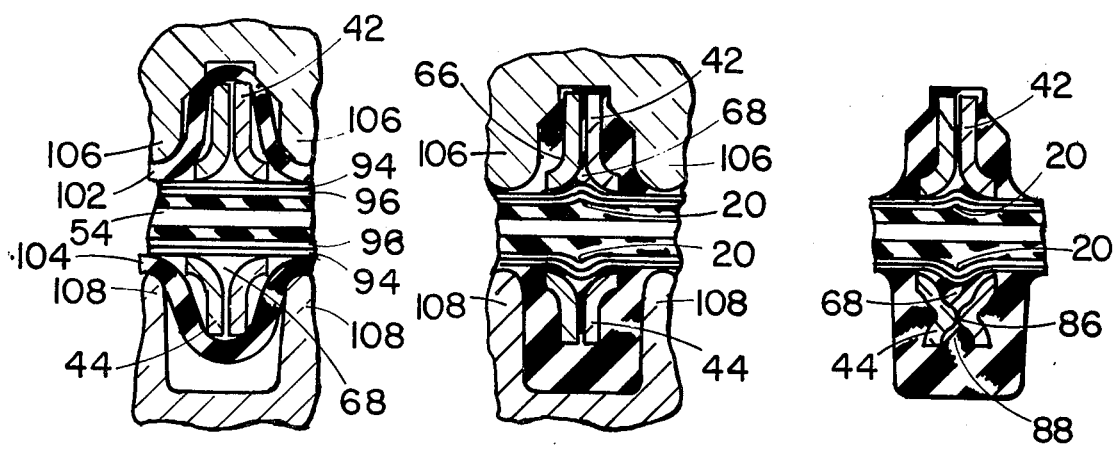
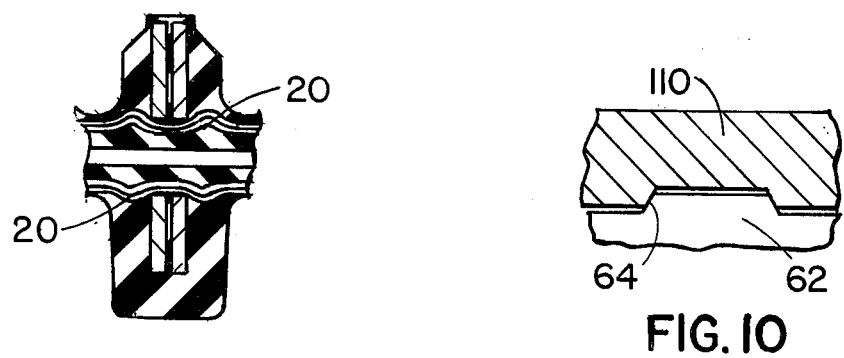

V-BELT

BACKGROUND OF THE INVENTION

The invention relates to machine elements and mechanisms, but more particularly, the invention relates to V-belts, V-blocks for variable speed belts, embedded reinforcements for V-blocks, a generally flat load carrying section for a V-block belt, and a process for making a V-block belt.

Standard V-belts have a belt width to belt thickness ratio of generally less than 2.0:1. The higher horsepower/torque capacity belts have a width to thickness ratio as close to 1:1 as possible. The low width to thickness ratio ensures adequate support of a spirally wound tensile member from sheaves that entrain the belt.

A variable speed belt is required to operate at various driver and driven sheave diameters to give a variable speed ratio. The change in diameter possible with a V-belt in a sheave having any given groove angle is directly proportional to the bottom width of the belt. A variable speed belt, therefore, should have a high top width to thickness ratio to give a sufficiently large bottom width for a reasonable sheave diameter change. Normally, a variable speed belt has a width to thickness ratio that is greater than 2.25:1. As the belt width increases, the horsepower/torque carrying capacity decreases primarily because the belt receives a lesser percentage of transverse support from its entraining sheaves. Expressed in other terms, the "sag" at the center of a belt for a fixed total tension and bending radius around a sheave, is about proportional to the cube of the belt width.

Early solutions to the variable speed belt transverse stiffness problem were solved by clamping individual V-blocks to a flat belt. Examples of such solutions appear in U.S. Pat. Nos. 2,387,183 and 2,638,007. These patents show a flat belt construction for the load carrying section, with a tensile member disposed in an elastomeric material, and in one case, transverse ribs at the radially inner side of the belt for engaging with clamping V-blocks. In both cases the V-blocks are individually clamped to the belt with threaded fasteners and an upper beam member. A problem with the clamping type V-blocks is that the beam members which clamp the flat belt load carrying section are interconnected with fasteners which create an articulated structure having an inability to effectively distribute substantially uniform power loads across the V-block driving surfaces.

Another solution to the transverse rigidity problem for variable speed belts is solved by embedding a metallic transverse reinforcement that extends below the tensile member and along the driving V sides of the belt. Such an arrangement is disclosed in U.S. Pat. No. 2,189,049 as a means for making a belt splice. However, the belt with a beam member only below the load carrying section has a very low horsepower/torque carrying capability (i.e., because the V-side members have no cross support above the load carrying section).

A common load distribution problem of these type belts is that the diagonal sides of the V-blocks are either not reinforced with a continuous member or that where there is a continuous V-side reinforcement member, it is arranged as a cantilevered beam member. In either case, there is an unequal load distribution across the V-sides which causes repeated rocking of the V-blocks. The rocking usually leads to early fastener failure or substantially reduces the power load capability of the belt.

A common term used by the belt industry to indicate a relative comparison between belts is "horsepower multiplier." The horsepower transmitting capability of a belt in a drive system is affected by belt speed and sheave diameter. For example, increasing the sheave diameter by 35% often doubles the power transmitting capability of a belt for a given life. A small improvement in horsepower/torque (i.e., load) carrying capacity has an enormous effect on belt life. This is why the real test of belt improvement is that of how much greater horsepower/torque can be carried at the same belt life. The ratio of the tested belt horsepower to a horsepower value established for a base line belt (at a given sheave diameter, rpm, and hours life) is referred to as horsepower multiplier. Using this definition and 1968 as the 1.0 index year, variable speed belts would have approximately the following horsepower multiplier relationship over the years: 1943/0.6; 1948/0.8; 1958/0.8; 1968/1.0 and 1978/1.6. It becomes exceedingly harder to double the horsepower multiplier for present day belts because successively doublings in performance for every improved base line belt establishes an exponential performance curve. It has taken approximately 35 years to achieve the 1.6 horsepower multiplier.

Those block belts which are made by clamping V-blocks to a flat belt seem to have a somewhat limited horsepower capability (e.g., a horsepower multiplier of 0.8) perhaps because the clamping arrangements sets up stress concentrations in the flat belt which lead to early failure as the flat belt is cycled in bending as it operates around entraining sheaves. A variable speed belt with a reinforcement disposed below the tensile member, such as disclosed in the U.S. Pat. No. 2,189,049, are also of lower performance (e.g., a 0.2 horsepower multiplier because of the clamping/splicing arrangement.

Technology has improved the variable speed belt's horsepower/torque capabilities. (e.g., the 1.6 horsepower multiplier). The present day high power belt typically has an endlessly wound tensile member that is sandwiched between an overcord section and an undercord section that has an embedded fiber or a plurality of laminated fabric layers that increases the belts transverse stiffness. It should be noted that the modern-day belt has a horsepower/torque carrying capability that is approximately 2.0 times that of the earlier day block belts.

The common problem with all three types of variable speed belts (i.e., block belt, undercord embedded reinforcement, and present day belt with oriented textile reinforcements), is that their performance as expressed in terms of horsepower multiplier is not greater than the 1.6 for the present day belt as based on 12.5 horsepower at 1750 rpm on two 4.75 pitch diameter sheaves for 100 hours.

SUMMARY OF THE INVENTION

In accordance with the invention, an improved V-block type belt is provided. The belt construction and method may be selectively chosen to provide an improved belt as measured in terms of horsepower multiplier from the 1.6 of the present day belts to a value of 2.0 or more.

Individual V-blocks have a reinforcement which is at least partially embedded in the block and which substantially surrounds and transversely supports both sides of a flat belt type load carrying section. The reinforcement has upper and lower parallel beam members that are arranged transversely of the belt and side members that are interconnected to and form diagonals with the beam members. The side members are embedded in the block juxtaposed the V-driving surfaces of the block.

The load carrying section has generally a symmetrical flat belt type construction and includes an overcord and undercord with preferably, an embedded textile reinforcement. Transversely oriented ribs are formed across the inner and outer surfaces. The flat belt overcord and undercord with transversely oriented ribs optionally sandwich a spirally wound tensile member.

The load carrying section may be formed using known techniques for building flat belts using curable polymers where a spirally wound tensile member is disposed between overcord and undercord layers of substantially the same thickness. Reinforcements are transversely oriented and interlocked on the load carrying section in a spaced fashion and polymeric material is arranged around at least a portion of the reinforcements as part of the V-blocks. The assembly is placed in a multi-V-block receiving cavity mold and subjected to pressure and/or temperature which displaces portions of the flat belt to form the ribs which interdigitate with the block assemblies and which molds and cures the assembly to define a V-block belt.

Accordingly, an object of the invention is to provide a variable speed belt which has improved load carrying capability over present day belts as measured by an increase of horsepower multiplier from the 1.6 for present day belts to at least 2 or greater.

Another object of the invention is to provide a belt of the V-block type with an improved reinforcement that does not depend on clamping or a plurality of fasteners for attachment to a flat belt. The object also includes embedding at least portions of the reinforcement in a polymeric material that forms the V sides and frictional driving surfaces of the V-blocks.

Another object of the invention is to provide an improved flat belt type load carrying section for use with a V-block belt to provide improved performance as well as a configuration which simplifies the flat belt making process.

Another object of the invention is to provide a method for making a V-block type belt where the flat belt is simultaneously cured and formed with the curing and forming of the individual V-blocks.

The advantage of the invention is the provision of a variable speed belt capable of operating in sheaves at a horsepower multiplier of 2.9 which is at least 1.8 times the level of existing belts. (i.e., a 1¾ inch top width belt, 30 degree sidewalls, 4.75 inch pitch diameter sheaves, 1750 rpm, 21 HP).

These and other objects or advantages of the invention will become more apparent after reviewing the drawings and descriptions thereof wherein:

FIG. 3 is an isometric view showing an alternate reinforcement element;

FIG. 4 is an isometric view showing an alternate form of the reinforcement element;

FIG. 5 is an isometric view showing an alternate reinforcement element;

FIG. 6 is a view taken along the line 6—6 of FIG. 2 and further showing a portion of an open mold;

FIG. 7 is a view taken along the line 7—7 of FIG. 1 and further showing a portion of a closed mold;

FIG. 8 is a view similar to FIG. 7 without the mold showing a cross section of a V-block with a modified reinforcement;

FIG. 9 is a view similar to FIG. 8 showing the reinforcement of FIG. 3 embedded in a V-block; and FIG. 10 is a view taken along the line 10—10 of FIG. 1 showing how the reinforcement is aligned.

DESCRIPTION OF PREFERRED EMBODIMENTS

Figure 1:
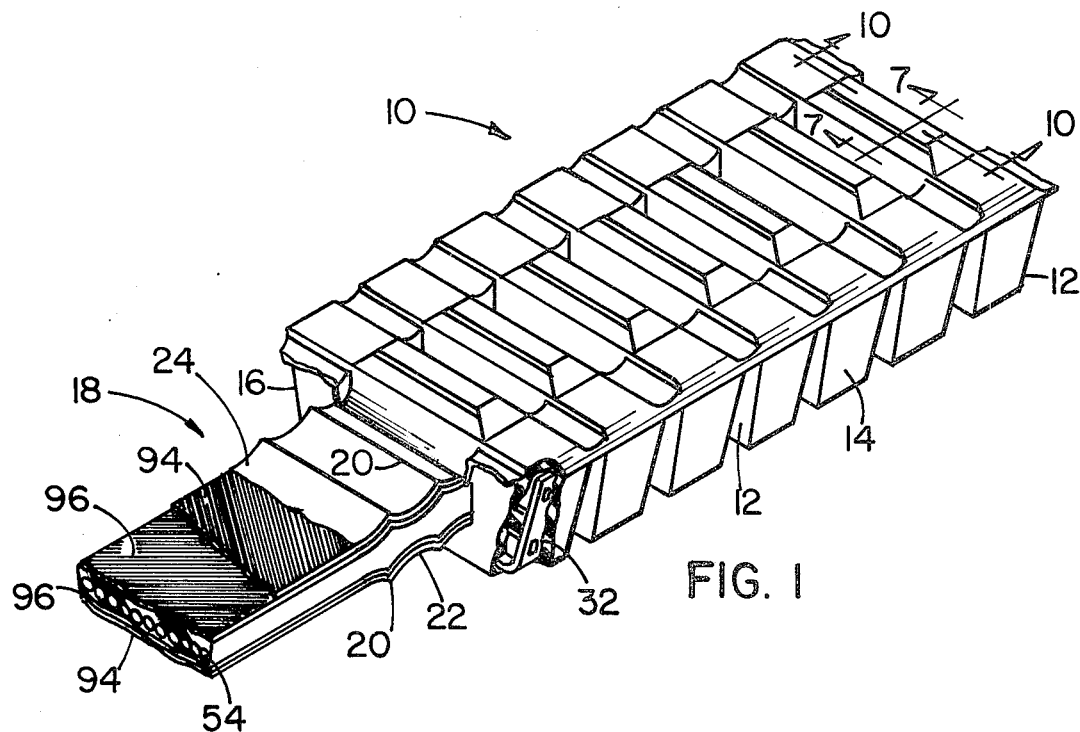
FIG. 1 is an isometrical fragmental view showing a portion of the belt.

Referring to the figures, a power transmission belt 10 of the V-block, variable speed type is provided. A plurality of spaced V-blocks 12 with oppositely facing frictional driving surfaces 14, 16 on the V-sides of the blocks are attached to a generally flat belt type load carrying section 18 which preferably has a plurality of transversely oriented ribs 20 or teeth formed at its inner 22 and outer 24 surfaces. More preferably, the blocks are integrally molded to the load carrying section. A reinforcement 26, which may be made in two parts 28, 30, is embedded 32 in each block and surrounds and supports the load carrying section. It is believed that the improved belt performance associated with the invention is attributable to synergistic contributions of: (1) the V-block reinforcement 26 and its embedded 32 emplacement near the driving surface portions 14, 16 of each polymeric block 12; (2) the configuration and construction of the generally flat load carrying section 18 and (3) the method of making the belt.

Reinforcement

FIGS. 2-5, 8 are exemplary of reinforcements made in accordance with the invention. The reinforcement elements 28, 30, 34, 36 of FIGS. 2-5 are generally U-shaped and hermaphroditic so that two oppositely oriented elements (e.g., 28, 30) surround the generally flat load carrying section and define a complete reinforcement 26. FIG. 5 also shows a two-part reinforcement with one U-shaped member 38 and one beam member 40. The common features to all reinforcements as assembled to the load carrying section are: upper 42 and lower 44 beam members; end members which form a diagonal 46 with the beam members; the complete surrounding of the load carrying section (FIGS. 1, 2); and the contributing reinforcement interaction between the upper and lower beam members and diagonal side member 46 to define a substantially unarticulated structure. Another common characteristic of the reinforcements is that they do not clamp the load carrying section and form stress concentrations therein.

Figure 2:
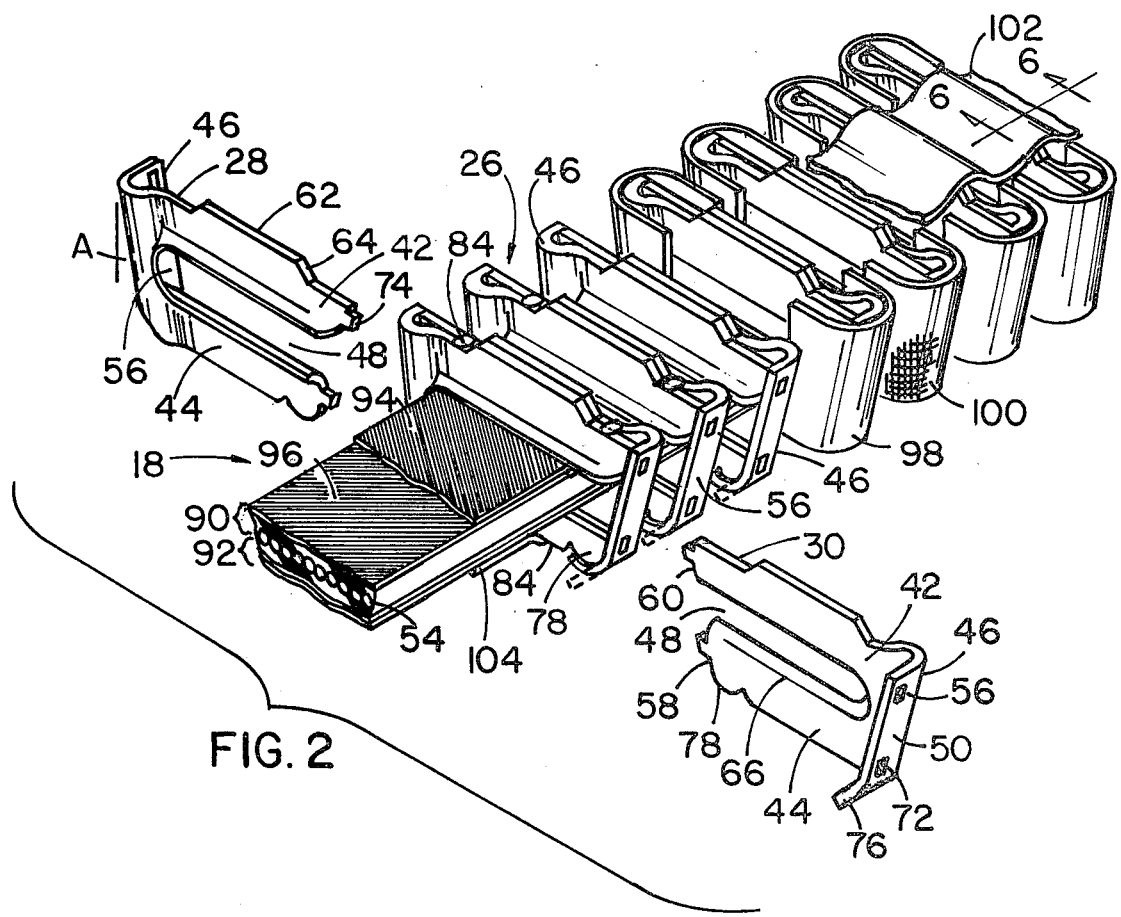
FIG. 2 is an exploded view showing a portion of the belt during phases of fabrication.

Referring more particularly to FIG. 2, a generally flat and generally U-shaped reinforcement element 28, 30 has substantially parallel leg portions that are spaced from each other and define the upper and lower beam members 42, 44 with a slot 48 for receiving the load carrying section or toothed belt. The parallel beam members are coextensive or cantilevered from the diagonal side 46 member having an exterior portion that forms an angle A of preferably from about 8° to about 30° in relation to the upper beam member. It is also preferred that the spacing between the upper beam members is juxtaposed substantially about a mid-point 50 of the diagonal side member, the purpose of which will be later explained. The diagonal side member is attached between the upper and lower beam members so as to form a built-in beam (i.e., the ends of the side member are built-in the upper and lower beams) that is capable of transferring moments to the upper and lower beam members. This permits a substantially uniform loading across the face of the diagonal side member and maintenance of a center of pressure from a sheave to a point near the equatorial plane (e.g., pitch line) of a tensile member 54. The diagonal reinforcement of FIGS. 2–4 has inherent built-in ends, while the reinforcement of FIG. 5 uses a mechanical interock or welding to provide the built-in feature.

The diagonal side may be flared to have curved edge portions or be flared and reverse bent to form a generally flat side with a surface 56 positioned substantially normal to a plane of the upper and lower beam members. When two members are assembled together, angled ends 58, 60 of the beam members abut the sides 56 and lend support thereto. The side may be further bent 57 to form a more symmetrical side.

A fin 62 optionally coextensively extends from either the upper or lower beam member to act as an aid in belt cooling. The fin may optionally include camming surfaces 64 which aid in positioning the reinforcement in its embedded position within the belt. This feature is described under the method portion.

Preferably, the juxtaposed facing sides of the upper and lower beam members have curved edge portions 66 so that when two U-shaped reinforcements are placed on the load carrying section from opposite sides, the curved edges define rib receiving channels 68 (FIGS. 6–8).

When U-shaped members as above-described are used, it is preferred that they be hermaphroditically designed to have means for receiving and interdigitating with the leg members of an opposingly oriented reinforcement. As shown in FIG. 3, the interdigitating means may be in the form of holes 69 and dimples 70 formed in the beam members. Another interdigitating means is shown in FIGS. 2 and 4 where apertures 72 are provided in the side members and receive extended pin portions 74 of the parallel beam members.

Optionally, the U-shaped reinforcement elements include an interlocking feature as more particularly shown in FIG. 2. A tab 76 extends from the side member which, after assembly on the generally flat or tensile section, is bent around a protrusion 78 of the lower leg member of an oppositely oriented reinforcement.

When the U-shaped member of FIG. 5 is used it is also preferred that the upper and lower beam members have channels 68 for receiving the ribs of the load carrying section. The upper beam member is snapped into place so that a tongue 80 of the upper member extends into an interlocking groove 82 of the U-shape member.

Assembled elements define an unarticulated reinforcement that provides good transverse support to the flat band type load carrying section without the necessity of clamping. However, improved all-around support to the load carrying section is accomplished by using mechanical interlocks as shown in FIG. 2 or by welding the pieces together at desired points 84. In any event, the final reinforcement completely surrounds and gives all-around support to the load carrying section with minimum clamping action.

The beam members are sized to withstand the forces imparted by a sheave when the belt is in use. Techniques such as embossing the beam members 86 or spreading 88 are techniques which may be used to impart additional strength by increasing the inertia areas (FIG. 8). The reinforcement may be made out of any desirable high modulus material such as metal (e.g., steel, aluminum, or the like) or high modulus plastic. The important thing is that the reinforcements surround the load carrying section and act as an integral unit while lending all-around support to the flat load carrying section.

Load Carrying Section

The load carrying section is initially fabricated in flat belt form to include flat band-type spirally wound tensile member 54 that is sandwiched by substantially equal thickness overcord 90 and undercord 92 layers. Preferably, the overcord and undercord have symmetrically layered constructions in reference to the tensile member. The overcord and undercord include a curable or settable polymeric material which preferably has reinforcements embedded therein. Examples of such polymeric materials include the natural rubbers, synthetic rubbers, urethanes and the like and the thermoplastic materials such as polyester and some urethanes. During a molding operation, both the thermoplastic or thermosetting polymers go into a plastic state and conform to a mold. The overcord and undercord may include a load transferring fibrous reinforcement such as discontinuous fibers (e.g., the natural occurring fibers such as cellulose or the synthetic fibers such as nylon, etc.); or, more preferably, one or two layers of a woven material 94, 96 disposed near the peripheral surfaces of the load carrying section. When square woven type fabrics are used, they may be oriented on the bias in relation to the endless member to enhance bending. Stretch fabric may also be used. A plurality of spaced ribs 20 extend transversely of the load carrying section and engage the reinforcement (FIGS. 7–9). The ribs may be in the form of a series of undulations with the reinforcing fabric also forming undulations that coincide in pitch in the overcord and undercord layers. The undulations are formed during the molding process when the polymeric material is in a plastic flowing state. The endlessly wound tensile member forms an equatorial plane where the beam members extend in a direction generally normal thereto on opposite sides of the equatorial plane. The undulations or ribs 20 protrude into the space or channels 68 of the reinforcement member or on either side of the reinforcement (FIG. 9) and interdigitate therewith.

Method

A flat belt is constructed using known techniques such as by applying several successive layers of material on a building drum to form the undercord 92, applying cord to form a tensile member 54, and then applying additional layers over the cord to form an overcord 90. The sleeve is cut at desired widths to form individual flat bands. The thickness of the flat band or belt is preferably chosen to be equal to or preferably greater than the slot 48 which helps to locate the reinforcement. The reinforcements are oriented transversely of the belt and preferably interlocked thereon such as by welding, bending tabs, latching or the like.

Polymeric material 98 is positioned to at least the diagonal side portions of the reinforcement to form the sides of the belt. Preferably, each V-block includes a reinforcement 100 such as a woven textile material or a dispersion of discontinuous fibers contained therein. Strips of polymeric material 102, 104 may be layered over the top and bottom surfaces of the uncured belt.

A portion of the belt is placed (FIG. 6) in a multi-V-block cavity open end mold that has parallel projections 106, 108 that extend transversely of the belt and between successive blocks. The spacing between the projections of the upper and lower mold cavities in the mold closed position is preferably less than the thickness of the flat belt. As the mold closes, the belt is squeezed by the projections and polymer is displaced juxtaposed the projections and into the channels 68 of the reinforcement or on either side of the reinforcement (FIG. 9) forming undulations, ribs, or teeth for meshing or engaging with the reinforcement. A portion of the mold engages the cam surfaces 64 of the fin 62 (FIG. 10) and aligns the reinforcement. Heat is applied to cure the belt in the case of those heat setting materials, or heat may be initially applied to the mold and the mold cooled to effect a setting of the material in the case of thermoplastic materials. As used herein, the terms "set" or "setting" are used to apply to either situation. In either case, the generally flat belt is molded into a load carrying section with a plurality of transverse ribs which engage the reinforcement.

Use

Belt performance may be incrementally affected by selecting different features of the invention. For example, those features which incrementally affect performance are: cooling fin; round surfaces at the beam member; channel of the beam member; curved surfaces at the side V; interlocking of the beam members to form an integral reinforcement unit; a generally flat side member perpendicular to the plane of the beam members; and of course, the various materials which can be selected for the tensile member and the polymers used for the frictional driving surfaces and the flat belt type load carrying section. For purpose of illustration, a belt is constructed with the higher producing performance features such as shown in FIG. 1. The detailed construction is:
Top width: 49.9 mm
Thickness: 22.9 mm
Tensile member: aramid fiber
Polymer: neoprene
Angle: 30°
Length: 1189 mm
No. of blocks: 89

The belt was subjected to the following test conditions for a period of 100 hours.
Sheave pitch diameter: 120 mm
Speed: 1750 rpm
Horsepower: 32

When this belt is compared to the belts mentioned above, it is seen that a horsepower multiplier of at least 2 is achieved, (e.g., 32 divided by 12.5 equals 2.56).

During operation, frictional forces are imparted from a sheave member to the frictional driving surfaces of the V-blocks. Forces from the frictional driving surfaces are transferred to the partially embedded reinforcement and then to the ribs or undulations on both sides of the load carrying section. The beams of reinforcement at the surface of the load carrying section helps distribute forces to the tensile member on radially inner and outer sides thereof without imparting any high degree of stress concentration to the tensile member. Also, high stress concentrations from clamping are avoided as the reinforcement is not required to be clamped to the load carrying section. Any stresses which may have been imparted by the reinforcement during manufacture using the preferable method of the invention, are relieved when the belt is in a plastic state before being set or cured. To illustrate that clamping is not required and does not substantially exist, a test belt similar to FIG. 2 was built with a layer of Teflon between the V-blocks and load carrying section so there would be no integral bonding; the test belt operated satisfactorily by carrying 32 HP at the above listed test conditions.

A salient feature of the invention that contributes to improved belt performance is that the tensile member is maintained in a substantially flat equatorial plane during belt manufacture and operation. During the manufacturing process, the protruding elements of the mold are substantially parallel with each other and serve to prevent the tensile member from moving out of its equatorial plane when the polymeric material is in a plastic state. Similarly, the embedded reinforcement prevents the spirally wound tensile member from moving as the mold is closed and pressures within the curing polymeric matrix induce some polymeric flow. The reinforcement keeps the tensile member in an equatorial plane during belt operation.

The lower beam member keeps the tensile member flat as the belt is wedged into a sheave. The upper beam member keeps the tensile member flat and reinforces the blocks as they are pulled from a sheave. The diagonal side member with its built-in ends is substantially evenly loaded and distributes the sheave loads to the upper and lower beam members.

Additional Species

The foregoing preferred embodiments describe an integrally molded belt and its process for making. However, the principles of the invention may be used in a belt assembled from component parts that are separately manufactured. For example, the load carrying section may be independently fabricated to have molded ribs at its radially inner and outer surfaces. The load carrying section takes the form of a belt with teeth (or ribs) formed in the undercord and overcord and may be constructed to have the appearance of the breakaway portions of FIG. 1.

The reinforcement is assembled on the cured belt by positioning and interlocking two members so as to have upper and lower beam members attached to diagonal side members so that each side member acts as a built-in beam between the upper and lower members. The arrangement also substantially eliminates clamping the load carrying section.

The embedding polymeric material may be injection molded around the diagonal side members.

The foregoing detailed description is made for purpose of illustration only and is not intended to limit the scope of the invention which is to be determined from the appended claims.

What is claimed is:

1. A power transmission belt comprising:
    a generally flat belt type load carrying section;
    a series of spaced blocks transversely positioned and attached to the load carrying section, the blocks molded of a polymeric material and having opposing V-type sides which define frictional driving surface areas; and
    a reinforcement for, and of which a portion is embedded in each block, each reinforcement including upper and lower beam members positioned transversely and at opposing radial sides to the load carrying section, and diagonal side members attached to the beam members and embedded in the blocks with a side member juxtaposed and lending support to each frictional driving surface, each reinforcement arranged so as to substantially surround and transversely support the load carrying section.

2. An embeddable reinforcement element for a V-belt of the type having a series of molded blocks attached and transversely oriented to a load carrying section of the flat band type, the reinforcement comprising:
a generally flat and generally U-shaped member including spaced substantially parallel leg portions that define upper and lower beam members that interconnect and are coextensive from an end member having an exterior side that forms a diagonal with the beam members.

3. A reinforcement element as claimed in claim 2 wherein the exterior side forms an angle from about 8 to about 30 degrees with one of the beam members.

4. A reinforcement element as claimed in claim 2 that includes a fin portion that is coextensive from one of the beam members.

5. A reinforcement element as claimed in claim 2 wherein the spacing between beam portions is juxtaposed substantially a mid-point of the exterior side.

6. A reinforcement element as claimed in claim 2 which further includes means disposed on the beam members for hermaphroditically receiving and interdigitating with the leg members of an opposingly oriented reinforcement element of the same configuration.

7. A power transmission belt comprising:
a load carrying section;
a series of spaced blocks transversely positioned and attached to the load carrying section, the blocks having opposing V-sides which define frictional driving surfaces;
a reinforcement at least partially embedded in each block, each reinforcement including upper and lower members positioned transversely of and at opposing radial sides of the load carrying section, and diagonal side members unarticuately attached to the beam members and embedded in the block with a side member juxtaposed the frictional driving surface, the reinforcement arranged to substantially surround the load carrying section.

8. An embeddable reinforcement element for a V-belt of the type having a series of molded blocks attached and transversely oriented to a load carrying section of the flat belt type, the reinforcement comprising:
spaced upper and lower beam members cantilevered in the same direction from and interconnected to an angularly intersecting side member with a generally flat surface positioned substantially normal to a plane of the cantilevered beam members.

9. A reinforcement element as claimed in claim 8 wherein juxtaposed sides of the beam members have curved edge portions.

10. A power transmission belt comprising:
a load carrying section comprising first and second layers of substantially elastomeric material sandwiching a wound tensile member, and at least one fabric layer disposed in each of the first and second layers and forming undulations transversely of the tensile member and wherein undulations of the fabric on the first layer coincides in pitch with undulations of the fabric in the second layer;
a series of reinforcements positioned transversely to the load carrying section including upper and lower beam members sandwiching the load carrying section and juxtaposed each other at coinciding undulations, and juxtaposed side members interconnecting the beam members exteriorly of the load carrying section; and
a series of blocks transversely arranged of the load carrying section with a block attached to each reinforcement.

11. A power transmission belt as set forth in claim 10 wherein the blocks are molded to the load carrying section and the reinforcements are at least partially embedded in the blocks.

12. A power transmission belt comprising:
a load carrying section comprising first and second layers of substantially elastomeric material sandwiching a wound ply tensile member, and at least one load transferring fibrous layer disposed in the first and second layers and forming generally undulating pattern transverse to the tensile member and wherein undulations of the load transferring layer of the first layer coincide in pitch with undulations of the load transferring layer of the second layer;
a series of reinforcements disposed transversely of the load carrying section, and a reinforcement comprising two generally U-shaped members oppositely oriented to each other, and each with upper and lower beam members positioned at coinciding undulations and sandwiching the load carrying section, and a side member interconnecting the upper and lower beam members of each U-shaped member whereby each reinforcement substantially surrounds the load carrying section; and
a series of molded blocks transversely arranged to the load carrying section with at least the side members of the reinforcement substantially embedded in each block.

13. An embeddable reinforcement for a V-belt of the type having a series of molded blocks attached and transversely oriented to a flat band type load carrying section having an equatorial plane, the reinforcement comprising:
spaced upper and lower beam members cantilevered in the same direction from and interconnected to at least one angularly intersecting side member, the beam members having sufficient length to extend transversely across the load carrying section, and at a radial spacing to position the beam members next to the load carrying section radially opposite sides of the equatorial plane; and
a portion of the beam members extending in a direction generally normal to the equatorial plane, the extended portion defining a camming surface means suitable for aligning the beam and side members in an embedded position while molding a block.

14. A power transmission belt comprising:
a load carrying section including a generally flat band type wound tensile member; first and second layers of an elastomeric matrix of about the same thickness sandwiching the tensile member and having transversely oriented ribs disposed at radially inner and outer surfaces; and a fibrous reinforcement disposed in each layer;
a series of spaced V-blocks transversely positioned and molded so as to completely surround the load carrying section, each block having oppositely facing V-driving surfaces with areas extending above and below an equatorial plane of the tensile member; and a series of reinforcements with each reinforcement including upper and lower beam members transversely sandwiching the load carrying section at the ribs and diagonal members interconnecting with the beam members and embedded in each block juxtaposed the V-driving surfaces so that an unarticulated reinforcement substantially surrounds the load carrying section.

15. A power transmission belt of the V-type comprising:

a generally flat band type load carrying section having a plurality of transversely oriented ribs disposed at radially inner and outer surfaces at substantially the same circumferential pitch;

a plurality of circumferentially spaced reinforcements that surround the load carrying section, each reinforcement comprising a beam member transversely oriented to the load carrying section and engaging a rib of the outer surface, a lower beam member transversely oriented to the load carrying section and engaging a rib of the outer surface, first and second side members attached to end portions of the upper and lower beams, each side member having end portions built in to the upper and lower beams;

polymeric material juxtaposed and attached to each side member and defining oppositely facing V-surfaces of the belt.

16. The power transmission belt as claimed in claim 15 wherein the upper and lower beam members have channels for receiving the engaging ribs.

17. In a method for making a V-block power transmission belt with steps of the type of fabricating a toothed flat belt and attaching V-blocks to the flat belt at the belt teeth, the improvement comprising the steps of:

placing reinforcements on the belt while simultaneously surrounding the belt with the reinforcements, each reinforcement defining radially upper and lower beam members extending transversely of the belt and engaging the teeth, and side members diagonally extending between the upper and lower beam members;

attaching the reinforcements to the belt and building a built-in beam with each side member between its corresponding upper and lower beam members while simultaneously avoiding substantial clamping of the belt; and at least partially embedding each side member in a polymeric material and forcing oppositely facing V-sides and driving surfaces on the V-blocks.

18. In a method for making a V-block power transmission belt with the steps of the type of fabricating a load carrying section of the flat belt, polymeric type, and attaching a plurality of V-blocks to the tensile member where each V-block includes radially upper and lower beam members that extend transversely to the load carrying section, the improvement comprising the steps of:

plastisizing the polymeric material of the load carrying section;

squeezing portions of the flat belt between the spaced V-blocks with a mold member and displacing polymeric material from near the mold member toward adjacent V-blocks;

forming transversely oriented ribs with the displaced polymeric material and meshing the ribs with the upper and lower beam members; and setting the polymeric material.

* * * * *